(12) United States Patent
Kihara et al.

(10) Patent No.: US 8,702,158 B2
(45) Date of Patent: Apr. 22, 2014

(54) STRUCTURE FOR VEHICLE BODY FRONT PORTION

(75) Inventors: Makoto Kihara, Wako (JP); Shuji Ichikawa, Wako (JP); Daisuke Naoi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1 day.

(21) Appl. No.: 13/699,399

(22) PCT Filed: Apr. 22, 2011

(86) PCT No.: PCT/JP2011/059917
§ 371 (c)(1),
(2), (4) Date: Nov. 21, 2012

(87) PCT Pub. No.: WO2011/148747
PCT Pub. Date: Dec. 1, 2011

(65) Prior Publication Data
US 2013/0069393 A1    Mar. 21, 2013

(30) Foreign Application Priority Data

May 25, 2010 (JP) ................................. 2010-119910
May 25, 2010 (JP) ................................. 2010-119912

(51) Int. Cl.
B62D 25/08 (2006.01)

(52) U.S. Cl.
USPC .................................................. 296/203.02

(58) Field of Classification Search
USPC ......... 296/203.02, 203.03, 187.1, 187.09, 29, 296/193.09, 205, 204, 70; 180/90.6
See application file for complete search history.

(56) References Cited

U.S. PATENT DOCUMENTS

| 6,568,745 | B2 * | 5/2003 | Kosuge et al. ........... 296/193.02 |
| 6,817,657 | B2 * | 11/2004 | Watanabe et al. ........ 296/203.02 |
| 7,832,795 | B2 * | 11/2010 | Yokoi et al. ................... 296/204 |
| 2008/0084092 | A1 | 4/2008 | Yokoi et al. |
| 2009/0146455 | A1 | 6/2009 | Honji et al. |
| 2010/0171340 | A1 | 7/2010 | Yasuhara et al. |

FOREIGN PATENT DOCUMENTS

| JP | S63-168167 | 11/1988 |
| JP | 08067273 A * | 3/1996 ............. B62D 25/20 |
| JP | 2003-094134 | 4/2003 |
| JP | 2003-191862 | 7/2003 |
| JP | 2007-210567 | 8/2007 |
| JP | 2008-080818 | 4/2008 |
| JP | 2009-018724 | 1/2009 |
| JP | 2009-137378 | 6/2009 |
| JP | 2010-105537 | 5/2010 |

* cited by examiner

*Primary Examiner* — Glenn Dayoan
*Assistant Examiner* — Pinel Romain
(74) *Attorney, Agent, or Firm* — Rankin, Hill & Clark LLP (57) ABSTRACT

A structure for a vehicle body front portion, provided with a cross-member (24) which is provided to a dashboard lower panel (19) on the engine room (13) side thereof and is extended between left and right front side frames (16, 16). The cross-member (24) is divided into left and right cross-members (65, 66). A cup-shaped joint cover (22) is sandwiched between the left and right cross-members (65, 66).

12 Claims, 9 Drawing Sheets

STRUCTURE FOR VEHICLE BODY FRONT PORTION

TECHNICAL FIELD

The present invention relates to a front vehicle body structure having a crossmember provided on that side of a dash panel which faces an engine space and extending between left and right front side frames.

BACKGROUND ART

The front vehicle body structure disclosed, for example, in Patent Literature 1 includes left and right front side frames extending in the front-rear direction of a vehicle body, a dash panel that separates an engine space from a passenger compartment, a pair of dash side panels provided on both vehicle-widthwise ends of the dash panel, and a pair of corner gussets that reinforce the corners between the dash panel and the dash side panels. In the front vehicle body structure described above, the rear end of an upper member that forms a rear portion of each of the front side frames coincides with the front end of the corresponding corner gusset.

According to the front vehicle body structure described above, a collision load acting on the front side frames is transmitted to the corner gussets via the dash panel and further transmitted from the corner gussets to the dash side panels, front pillars, and other vehicle body members.

In the front vehicle body structure disclosed in Patent Literature 1, a central component of a crossmember is disposed along the vehicle width direction, and the crossmember is connected to the left and right front side frames via crossmember extensions. The crossmember could therefore disadvantageously interfere with a joint cover through which a steering shaft is inserted. To dispose the steering shaft in an optimum attitude, the crossmember is required to be lower than the joint cover. In this case, however, the crossmember connected to the left and right front side frames cannot be disposed at an optimum height.

In the configuration described above, the steering shaft cannot be disposed in an optimum attitude that allows a passenger compartment space to be large enough for a vehicle occupant to readily drive the vehicle, nor can the crossmember be disposed in an optimum position that allows a steady deformation mode of the left and right front side frames to be achieved when a head-on collision occurs.

PRIOR ART LITERATURE

Patent Literature

Patent Literature 1: Japanese Patent Application Laid-Open Publication No. 2008-080818 A

SUMMARY OF INVENTION

Technical Problem

An object of the invention is to provide a front vehicle body structure that not only allows a steering shaft to be disposed in an optimum attitude so that a passenger compartment space is large enough for a vehicle occupant to readily drive the vehicle but also allows a crossmember to be disposed in an optimum position so that a steady deformation mode of left and right front side frames is achieved when a head-on collision occurs.

Solution to Problem

According to a first aspect of the present invention, there is provided a front vehicle body structure comprising: left and right front side frames extending in a front-rear direction of a vehicle body; left and right side sills disposed toward a rear of the vehicle body relative to the left and right front side frames and extending in the front-rear direction of the vehicle body; a dash panel for separating an engine space from a passenger compartment, the dash panel extending in a vehicle width direction; a cup-shaped joint cover provided on the dash panel on a side facing the engine space, and having an opening through which a steering shaft is inserted; and a crossmember provided on the dash panel on a side facing the engine space, and extending between the left and right front side frames. The crossmember is divided into a left crossmember and a right crossmember, and the cup-shaped joint cover is sandwiched between the left and right crossmembers.

According to a second aspect of the invention, the joint cover preferably protrudes forward from the left and right crossmembers.

According to a third aspect of the invention, the joint cover preferably has a lower tensile strength than that of the left and right crossmembers and a plate thickness greater than those of the left and right crossmembers.

According to a fourth aspect of the invention, the joint cover preferably has a bottom surface through which the opening is formed, a circumferential wall extending from the bottom surface to the dash panel, an annular flange formed around an outer circumference of the circumferential wall, and left and right flat surfaces formed by making part of the circumferential wall flat. The annular flange is preferably connected to the dash panel. An end of the left and right crossmembers is preferably connected to the left and right flat surfaces, respectively.

According to a fifth aspect of the invention, a rear end portions of the front side frame is preferably inclined downward toward a rear of the vehicle body and connected to the side sills via an outrigger having a shape widening toward the end.

According to a sixth aspect of the invention, the dash panel preferably includes a vertical reinforcing member that intersects the crossmember and reinforces the dash panel.

According to a seventh aspect of the invention, the front side frame preferably has a horizontal portion extending substantially horizontally in the front-rear direction of the vehicle body in the engine space and an inclined portion inclined downward from the horizontal portion toward the rear of the vehicle body and connected to the side sill via an outrigger having a shape widening toward the end. The dash panel and the crossmember are preferably connected in the vicinity of a rear end of the horizontal portion of the front side frame. The front side frame is preferably connected to the dash panel and the crossmember via a crossmember extension that assists the front side frame in breaking steadily at the time of an offset collision.

According to an eighth aspect of the invention, the front side frame preferably includes a stiffener provided in the front side frame and reinforcing the front side frame and has a break point between the stiffener and the corresponding crossmember extension.

According to a ninth aspect of the invention, the outrigger is preferably part of a passenger compartment space member disposed in a lower portion of the passenger compartment. The horizontal portion of the front side frame is preferably part of an engine space member disposed in the engine space. The crossmember is preferably part of a crossmember assembly disposed to substantially overlap with the crossmember as viewed from one side. The passenger compartment space member is preferably separated from the engine space member by the crossmember assembly.

According to a tenth aspect of the invention, the crossmember extension is preferably connected to a gusset via the dash panel, and the gusset is preferably provided to a side portion of the dash panel on a side facing the passenger compartment.

According to an eleventh aspect of the invention, the crossmember is preferably spot-welded to the crossmember extension using a welding opening formed through the dash panel.

According to a twelfth aspect of the invention, a rear portion of the crossmember extension preferably forms an upper wall curved upward toward the crossmember and extending inward in the vehicle width direction.

Advantageous Effects of Invention

According to the first aspect of the invention, since the crossmember is divided into the left crossmember and the right crossmember, which sandwich the cup-shaped joint cover, the crossmember can extend at an optimum height between the left and right front side frames even when the joint cover is present at the same height as the crossmember. The passenger compartment space thus allows the steering shaft to be disposed in an optimum attitude and a vehicle occupant to readily drive the vehicle. Further, when a head-on collision occurs, a steady deformation mode of the left and right front side frames can be achieved.

According to the second aspect of the invention, the cup-shaped joint cover protrudes forward from the left and right crossmembers. As a result, when a head-on collision occurs and the engine or any other power unit retracts, the joint cover is first deformed and hence the magnitude of impact is reduced.

According to the third aspect of the invention, since the cup-shaped joint cover is made of a material having tensile strength smaller than that of the left and right crossmembers and formed of a plate thicker than the left and right crossmembers, the joint cover more readily deforms and can absorb a greater amount of energy than the left and right crossmembers.

According to the fourth aspect of the invention, since the annular flange is connected to the dash panel, the left and right crossmembers can be reinforced. Since the ends of the left and right crossmember are connected to the left and right flat surfaces, the left and right crossmember ends can be connected to the joint cover more firmly, for example, even when the circumferential wall of the joint cover is curved.

According to the fifth aspect of the invention, since the rear portions of the front side frames are inclined downward toward the rear of the vehicle body and connected to the side sills via the outriggers, each of which has a shape widening toward its end, a head-on collision load acting on the front side frames can be actively distributed to the side sills. Further, when a head-on collision load acts on one of the front side frames, the head-on collision load can also be distributed to the side sill on the other side via the crossmember and the outrigger on the other side.

According to the sixth aspect of the invention, since the vertical reinforcing member, which intersects the crossmember to reinforce the dash panel, is provided on the dash panel, the vertical reinforcing member can not only reinforce the dash panel but also improve how firmly the crossmember is supported. As a result, vibration from a road surface will not be transmitted.

According to the seventh aspect of the invention, since the dash panel and the crossmember are connected in the vicinity of the rear ends of the horizontal portions of the front side frames, a collision load can be smoothly transmitted and distributed rightward and leftward. Since the front side frames are connected to the dash panel and the crossmember via the crossmember extensions, which encourage the front side frames to break steadily at the time of an offset collision, the front side frames can steadily break in a controlled manner at the time of an offset collision.

According to the eighth aspect of the invention, since each of the front side frame is provided with and reinforced by the corresponding stiffener, and the break point is set between the stiffener and the corresponding crossmember extension, the stress induced by a collision load can be concentrated at the break point, and a collision mode can be reliably controlled at the position where the broken point is set.

According to the ninth aspect of the invention, since the passenger compartment space member is separated from the engine space member by the crossmember assembly, for example, replacing the crossmember assembly with other types allows the existing engine space to be commonly used and readily connected to a variety of passenger compartment spaces. In this way, the versatility of the front vehicle body structure can be enhanced.

According to the tenth aspect of the invention, since the gussets connected to the crossmember extensions via the dash panel are attached to side portions of the dash panel on the side facing the passenger compartment, the strength and rigidity of the dash panel can be improved. Since the crossmember extensions disposed behind the break points are supported by the crossmember and the gussets, the stress induced by a collision load can be concentrated at the break points (portions to be desirably broken). As a result, a collision mode can be reliably controlled at the positions where the break points are set. Further, no cross-sectional collapse of the members between the break points and the rear of the vehicle will occur.

According to the eleventh aspect of the invention, since the crossmember extensions are spot-welded to the crossmembers by using the welding openings formed through the dash panel, the workability of the spot welding and hence the crossmember connection strength can be improved.

According to the twelfth aspect of the invention, since the inner rear portions of the crossmember extensions are curved upward and extend toward the crossmember, the area where the crossmember extensions are connected to the crossmember can be increased. An impact load can therefore be more efficiently transmitted to the crossmember.

MODE FOR CARRYING OUT THE INVENTION

Certain preferred embodiments of the present invention are described below with reference to the accompanying drawings.
(Embodiment)

Referring to FIGS. 1 to 5, a vehicle 10 includes a vehicle body 11. The vehicle body 11 includes left and right front side frames 16, 16 extending in the front-rear direction of the vehicle body. Left and right side sills 14, 14 are disposed toward a rear of the vehicle body relative to the left and right front side frames 16, 16. A dash panel 19 separates a passenger compartment 12 from an engine space 13 and extends in a vehicle width direction.

A cup-shaped joint cover 22 is provided on the dash panel 19 on the side facing the engine space 13 and has an opening 74 (see FIG. 3) through which a steering shaft 21 is inserted. A crossmember 24 is provided on the dash panel 19 on the side facing the engine space 13 and extends between the left and right front side frames 16, 16. Each of the left and right front side frames 16, 16 has rear inclined portions 32, 32. Left and right outriggers 25, 25 extend from the respective inclined portions 32, 32 and are connected to the left and right side sills 14, 14.

Left and right floor frames 26, 26 extend from the inclined portions 32, 32 of the front side frames 16, 16 toward the rear of the vehicle body. Left and right central frames 27, 27 curve from the inclined portions 32, 32 inward in the vehicle body and extend toward the rear of the vehicle body.

A gear box 28, which steers wheels, is provided at a lower end of the steering shaft 21. The dash panel 19 and the crossmember 24 are disposed in the vicinity of the rear ends of horizontal portions 31 of the front side frames 16, 16.

A front vehicle body structure 20 includes the left and right front side frames 16, 16, the left and right side sills 14, 14, the dash panel 19, the cup-shaped joint cover 22, and the crossmember 24. That is, the front vehicle body structure 20 is a structure that incorporates the dash panel 19, the cup-shaped joint cover 22, and the crossmember 24 and parts therearound.

Each of the front side frames 16, 16 includes the horizontal portion 31 extending in a substantially horizontal direction in the engine space 13 and the inclined portion 32 inclined downward from the horizontal portion 31 toward the rear of the vehicle body and connected to the side sill 14 via the outrigger 25. The outrigger 25 has a shape spreading from the inclined portion 32 toward the side sill 14.

The horizontal portion 31 has a frame body 34 having a U-shaped cross section. The open end of the frame body 34 faces outward in the vehicle width direction, and upper and lower flanges 34d, 34e are provided along upper and lower edges of the open end in the longitudinal direction of the frame body 34. The open end of the frame body 34 is blocked by a flat lid 36 bonded to the upper and lower flanges 34d, 34e. That is, the horizontal portion 31 is a frame having a closed cross-sectional shape.

The frame body 34 has an upper surface 34a, a lower surface 34b, and a side surface 34c.

The inclined portion 32 is a U-shaped frame that is open upward. The inclined portion 32, which is a rear end portion of the front side frame 16, is inclined downward toward the rear of the vehicle body and connected to the side sill 14 via the outrigger 25, which has a shape widening toward its end.

Figure 1:
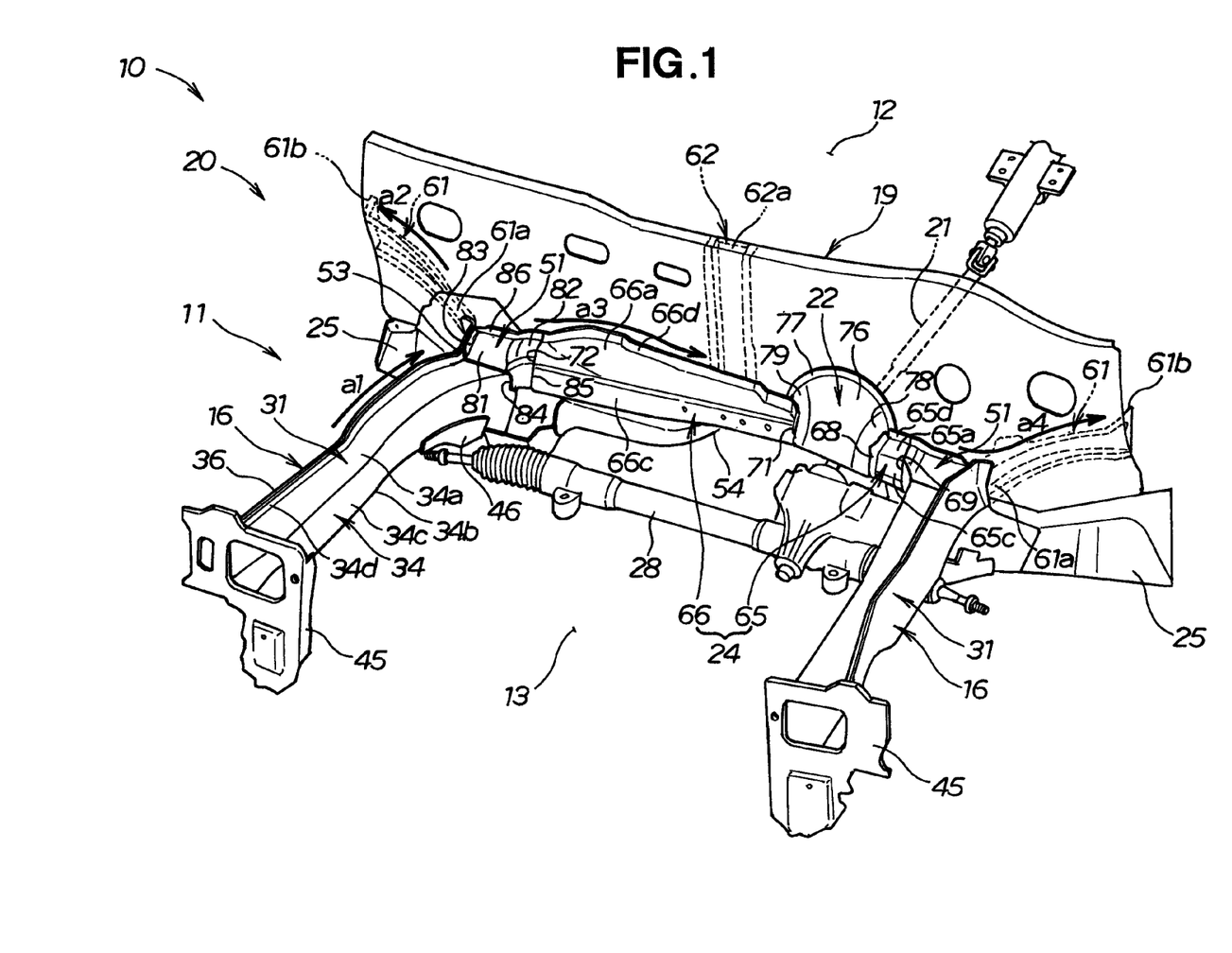
FIG. 1 is a perspective view of a vehicle employing a front vehicle body structure according to an embodiment of the present invention.
Figure 3:
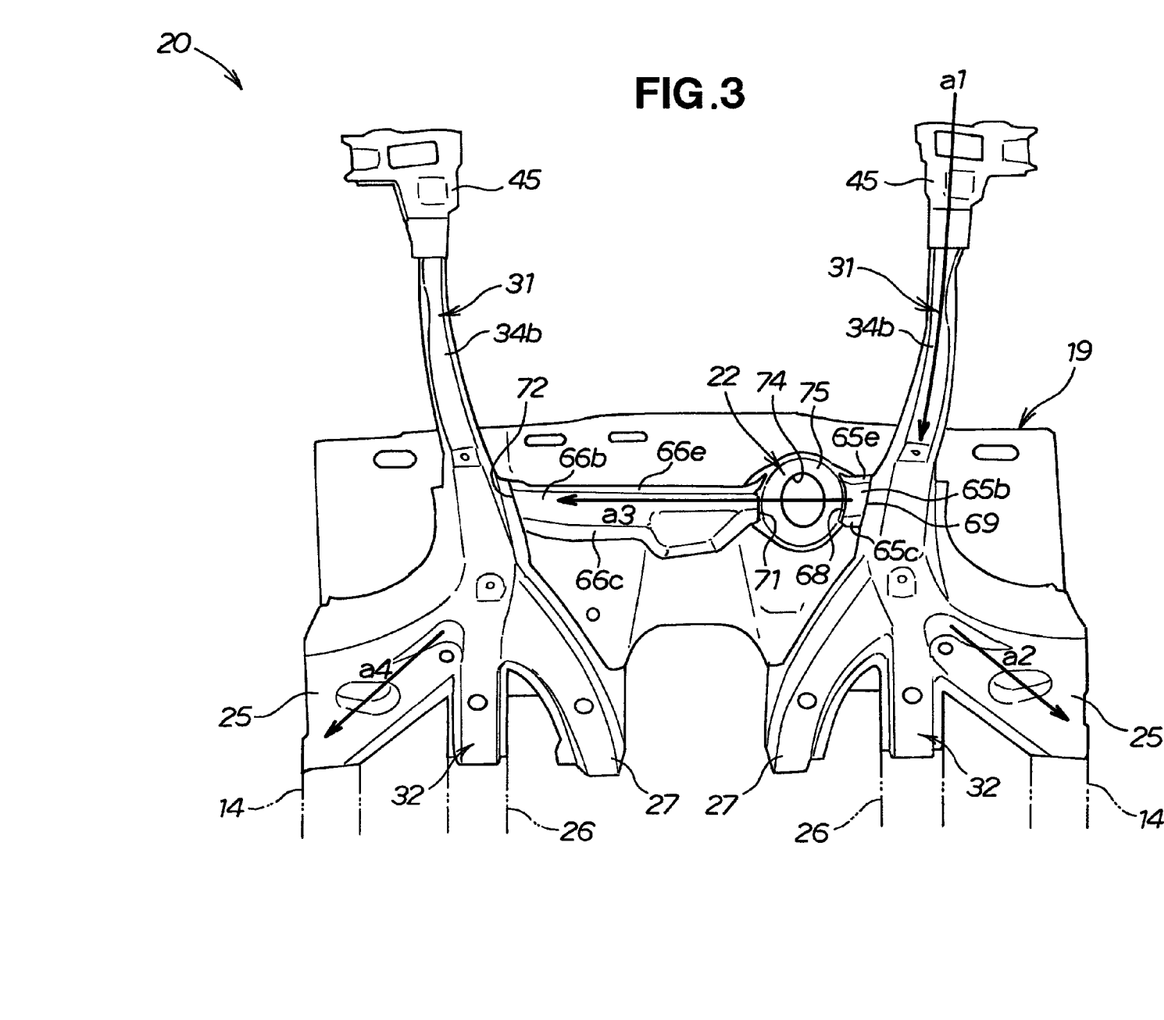
FIG. 3 is a bottom view of the front vehicle body structure of in FIG. 1.

That is, as shown in FIGS. 1 and 3, when a head-on collision load acts on one of the front side frames 16 as indicated by the arrow a1, the head-on collision load is transmitted not only to the corresponding one of the side sills 14 via the corresponding one of the outriggers 25 as indicated by the arrow a2 but also to the other outrigger 25 via the crossmember 24 as indicated by the arrow a3, and the outrigger 25 transmits the load to the other side sill 14 as indicated by the arrow a4. The head-on collision load is thus distributed.

Figure 4:
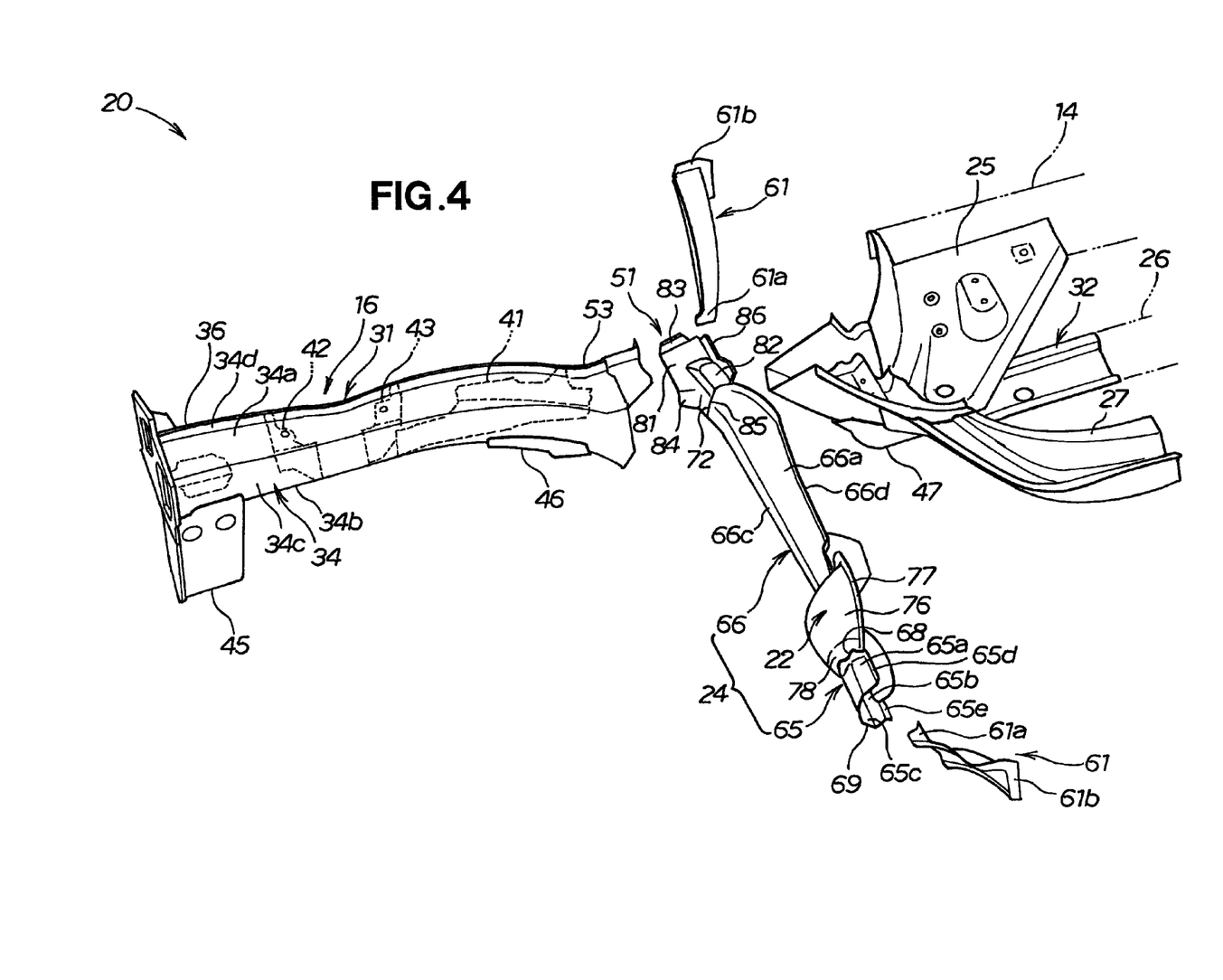
FIG. 4 is an exploded perspective view of the front vehicle body structure shown in FIG. 1.
Figure 5:
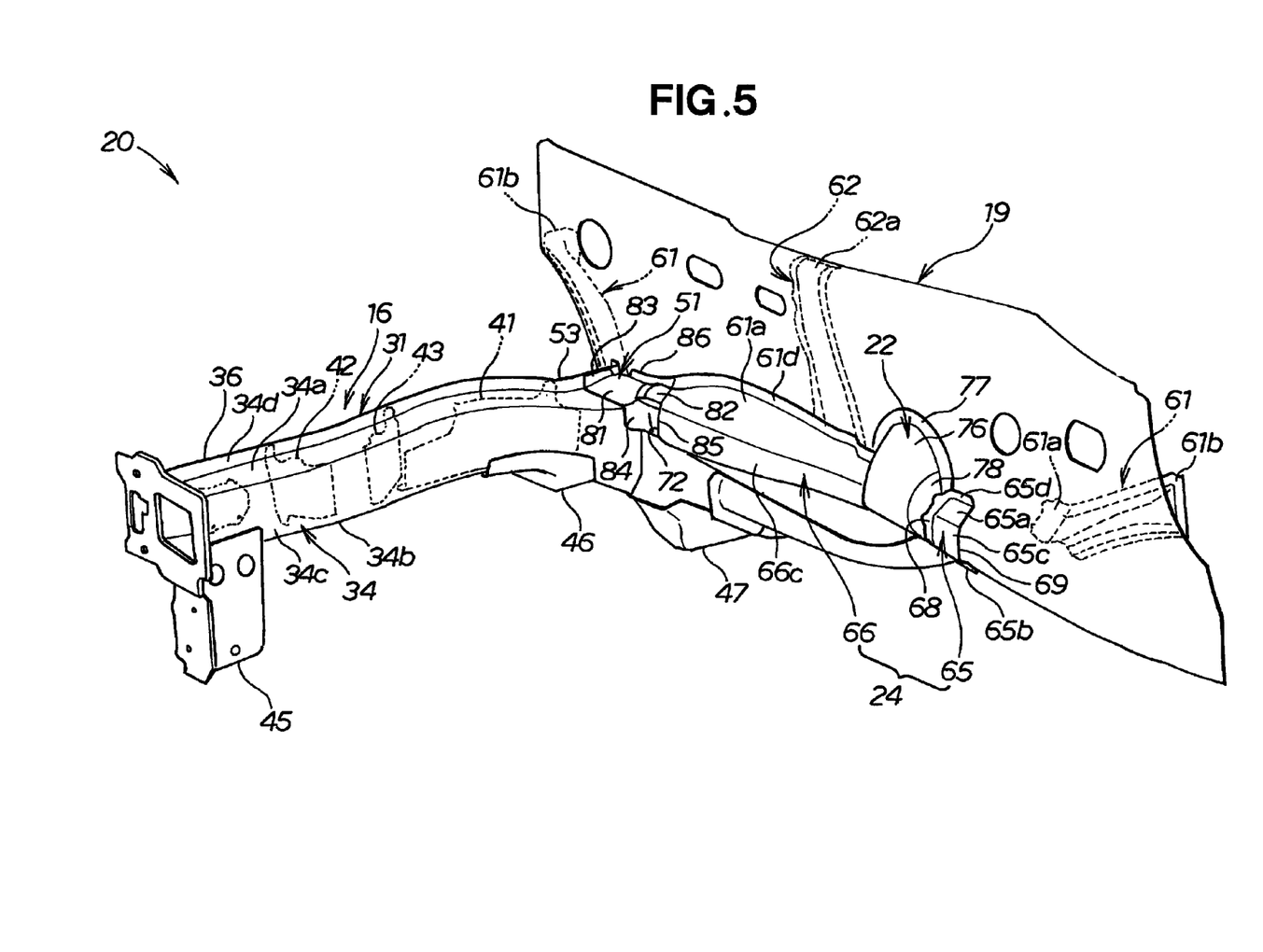
FIG. 5 is a perspective view of the front vehicle body structure with the exploded parts of FIG. 4 assembled.

In the horizontal portion 31 of each of the front side frames 16, a stiffener 41 for reinforcing the front side frame 16 and front and rear brackets 42, 43 for attaching an engine mount (not shown) are provided, as shown in FIGS. 4 and 5.

A front mount 45 for supporting a front sub-frame (not shown) is provided at a lower front portion of the horizontal portion 31. An intermediate mount 46 for supporting the front sub-frame (not shown) is provided at a lower rear portion the horizontal portion 31. A rear mount (not shown) for supporting the front sub-frame (not shown) is provided at a lower portion of the inclined portion 32.

A break point 53, where each of the front side frames 16 is bent and break when a collision load is applied thereto, is formed in a predetermined position on the outer side of the horizontal portion 31 in the vehicle width direction. The left and right front side frames 16, 16 are substantially symmetric with respect to the center of the vehicle width direction.

Figure 8:
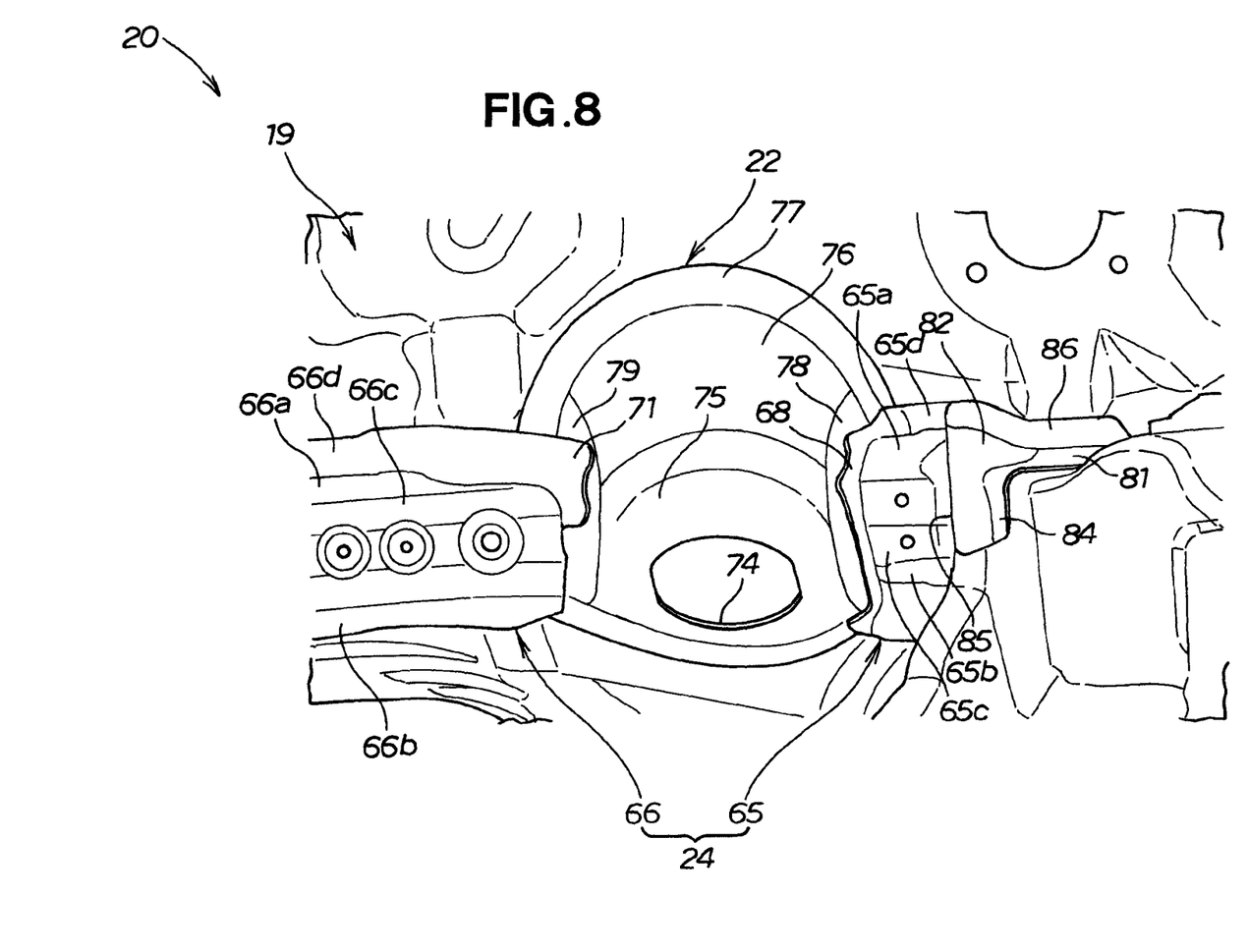
FIG. 8 is a perspective view of a joint cover and parts therearound shown in FIG. 5.
Figure 9:
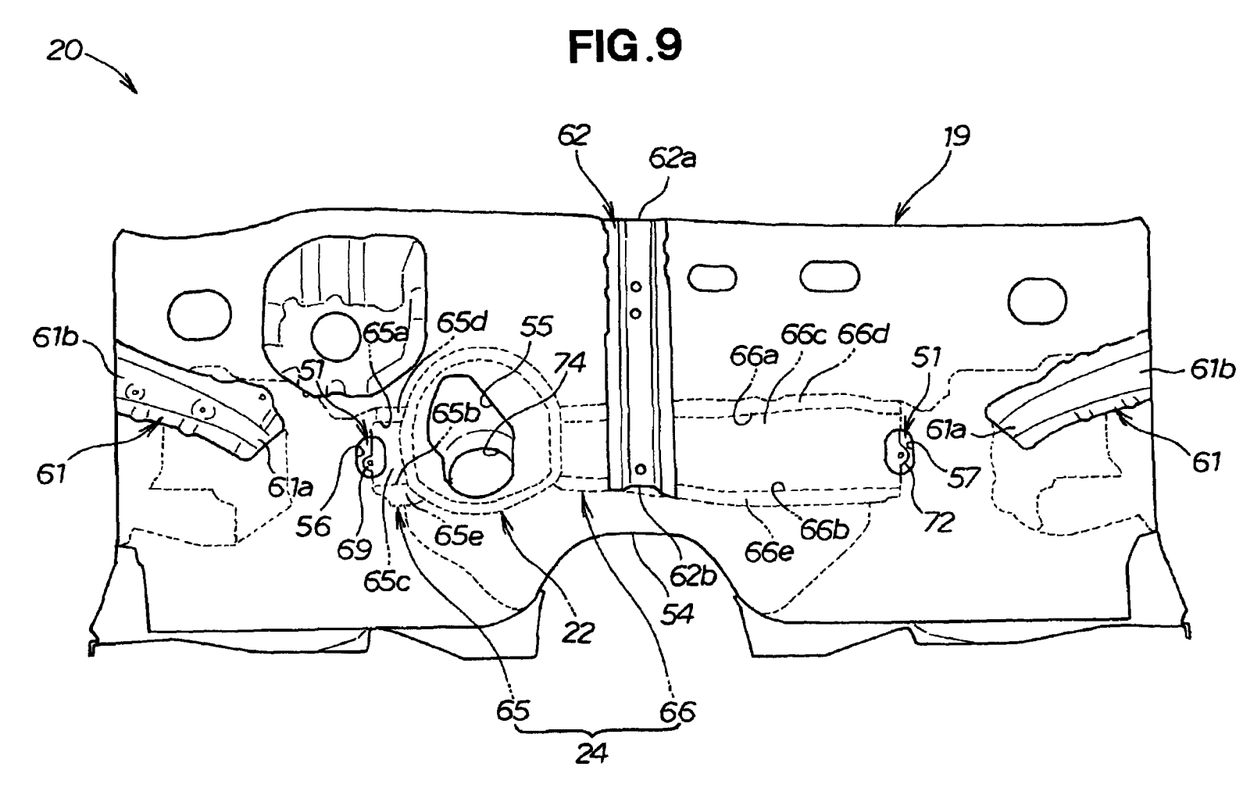
FIG. 9 is a perspective view of the joint cover and parts therearound shown in FIG. 5 as seen from a passenger compartment.

The dash panel 19 has a tunnel 54 located in a lower central portion thereof and smoothly connected to a central tunnel (not shown), a dash opening 55 which is a counterpart of the joint cover opening 74 and through which the steering shaft 21 (FIG. 1) is inserted, a left welding opening 56 for welding a left crossmember 65 to a left crossmember extension 51, and a right welding opening 57 for welding a right crossmember 66 to a right crossmember extension 51, as shown in FIGS. 8 and 9.

That is, the left and right crossmember extensions 51, 51 are spot-welded to the left and right crossmembers 65, 66 using the left and right welding openings 56, 57 provided through the dash panel 19. The number of spot-welded portions is thus increased, whereby the crossmember connection strength can be improved.

Gussets 61, 61 are attached to vehicle-widthwise outer portions of the dash panel 19 on the side facing the passenger compartment 12, and a vertical reinforcing member 62 is attached to a vehicle-widthwise central portion of the dash panel 19 on the side facing the passenger compartment 12. Each of the gussets 61 has a concave cross-sectional shape. Front ends 61a of the gussets 61 are connected to the respective crossmember extensions 51 via the dash panel 19, and rear ends 61b of the gussets 61 are connected to front pillars (not shown).

The vertical reinforcing member 62 has a concave cross-sectional shape. An upper end 62a of the vertical reinforcing member 62 is connected to a dash upper portion (not shown), and a lower end 62b of the vertical reinforcing member 62 is connected to the right crossmember 66. That is, the vertical reinforcing member 62 intersects the crossmember 24 and reinforces the dash panel 19.

For example, extending the lower end 62b of the vertical reinforcing member 62, which faces the passenger compartment 12, beyond the crossmember 24 to the tunnel 54, even to the central frames 27, 27 (FIGS. 3 and 4), allows the resistance to a head-on collision load to be further improved.

The crossmember 24 (left and right crossmembers 65, 66), the cup-shaped joint cover 22, and the left and right crossmember extensions 51, 51 are disposed on the dash panel 19 on the side facing the engine space 13, as shown in FIG. 1.

The crossmember 24 is divided into the left crossmember 65 and the right crossmember 66, as shown in FIGS. 1, 4, and 5. The left crossmember 65 has a U-shaped cross section and is shorter than the right crossmember 66. Connecting the crossmember 24 to the left and right front side frames 16, 16 allows a collision load to be smoothly transmitted and distributed to the dash panel 19 rightward and leftward.

The right crossmember 66 has a U-shaped cross section and has an upper surface 66a, a lower surface 66b, a front surface 66c, an upper flange 66d, and a lower flange 66e, as shown in FIGS. 1 and 9. A vehicle-widthwise inner end 71 of the right crossmember 66 (end of right crossmember) is connected to a right flat surface 79 of the cup-shaped joint cover 22. A vehicle-widthwise outer end 72 of the right crossmember 66 is connected to the dash panel 19 and the right front side frame 16 via the right crossmember extension (connection member) 51.

The left crossmember 65 has a U-shaped cross section and has an upper surface 65a, a lower surface 65b, a front surface 65c, an upper flange 65d, and a lower flange 65e.

A vehicle-widthwise inner end 68 of the left crossmember 65 (end of left crossmember) is connected to a left flat surface 78 of the joint cover 22. A vehicle-widthwise outer end 69 of the left crossmember 65 is connected to the dash panel 19 and the left front side frame 16 via the left crossmember extension (connection member) 51.

The cup-shaped joint cover 22 has a bottom surface 75 through which the opening 74 is formed, a circumferential wall 76 extending from the bottom surface 75 toward the dash panel 19, an annular flange 77 formed around the end of the circumferential wall 76, and the left and right flat surfaces 78, 79 formed by making part of the circumferential wall 76 flat, as shown FIGS. 4 and 8.

The annular flange 77 is connected to the dash panel 19. The left and right flat surfaces 78, 79 are connected to the ends 68, 71 of the left and right crossmembers, as described above.

Figure 2:
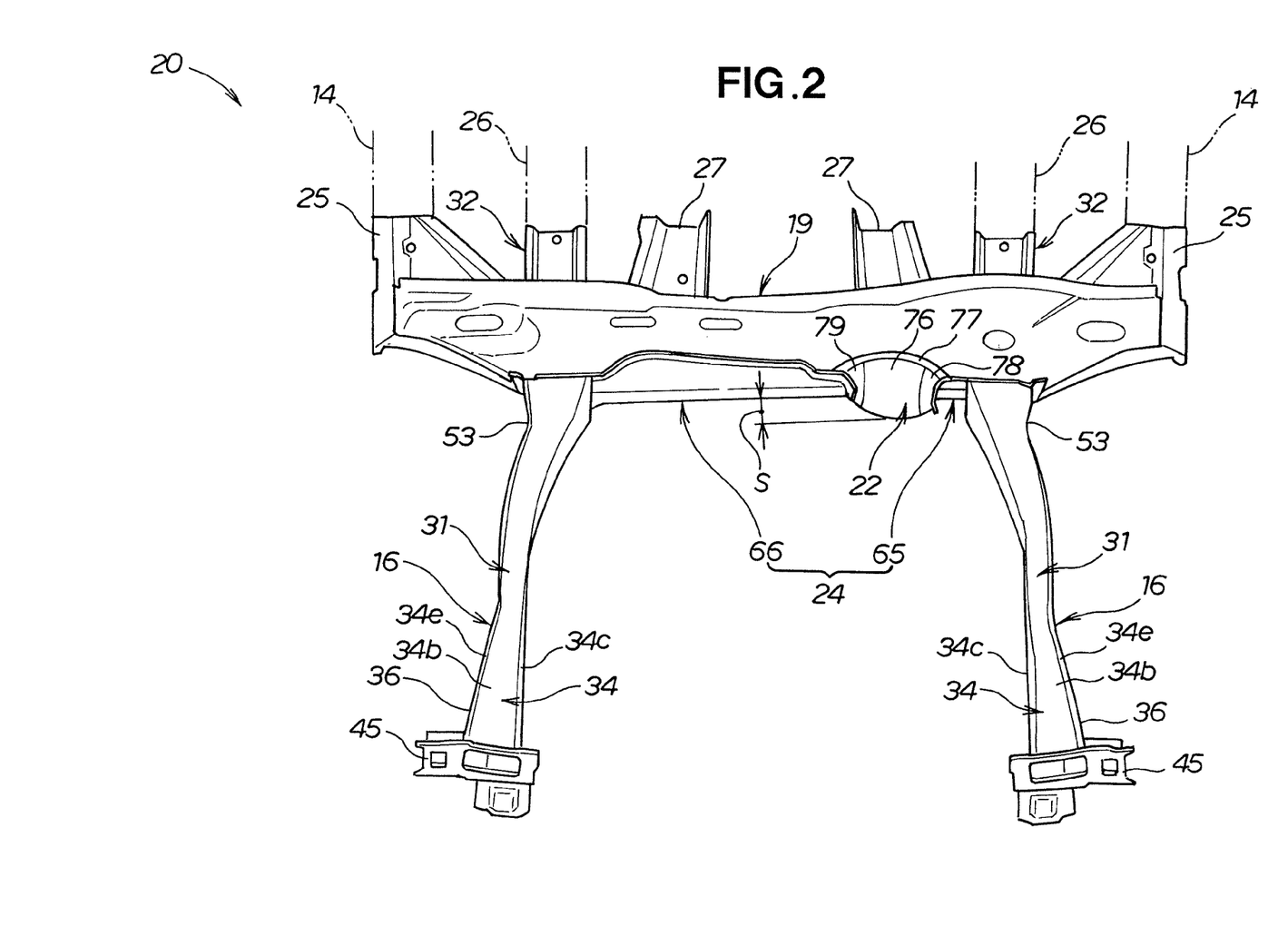
FIG. 2 is a plan view of the front vehicle body structure of FIG. 1.

The cup-shaped joint cover 22 protrudes forward by a dimension S from the left and right crossmembers 65, 66, as shown in FIG. 2. The joint cover 22 is made of a material having tensile strength smaller than that of the left and right crossmembers 65, 66 so that the joint cover 22 more readily deforms. Further, the joint cover 22 is formed of a plate that is thicker than the left and right crossmembers 65, 66 so that the joint cover 22 has improved energy absorption property. The joint cover 22 is formed, for example, of a typical steel plate (corresponding to one having a tensile strength of 270 MPa and a thickness t of 1.8 mm). Each of the left and right crossmembers 65, 66 is formed of a high tensile strength steel plate (corresponding to one having a tensile strength of 440 MPa and a thickness t of 1.4 mm).

The crossmember extensions 51 are members that connect the front side frames 16 to the dash panel 19 and the left and right crossmembers 65, 66 and serve to encourage the front side frames 16 to reliably break at the time of an offset collision, as shown in FIGS. 1 to 5.

Each of the crossmember extensions 51 is disposed behind the break point 53 of the corresponding front side frame 16. That is, reinforcing both sides of the bent point 53 with the stiffener 41 (FIG. 4) and the crossmember extension 51 prevents deformation of the crossmember extension 51 (member that connects the upper surface 34a of the front side frame 16 to the dash panel 19 and the crossmember 24) behind the break point 53. The stress induced by a collision load can therefore be concentrated at the break point 53. As a result, a collision mode can be reliably controlled at the position where the break point 53 is set. Further, no cross-sectional collapse behind the break point 53 will occur.

The crossmember extensions 51 are supported by the crossmember 24 (left and right crossmembers 65, 66) and the gussets 61, 61 connected to the dash panel 19, as shown in FIGS. 1 and 4.

The crossmember 24 is formed of the left and right crossmembers 65, 66 and the cup-shaped joint cover 22 and has a structure in which the left and right crossmembers 65, 66 sandwich the joint cover 22.

The right crossmember extension 51 has a body 81 that forms an upper portion of the right crossmember extension 51, a curved portion 82 formed of a vehicle-widthwise inner upper surface of the body 81 curved upward and extending toward the right crossmember 66, an outer bonding portion 83 formed by bending a vehicle-widthwise outer portion of the body 81 upward, an inner bonding portion 84 formed by bending a vehicle-widthwise inner portion of the body 81 downward, a crossmember bonding portion 85 formed on the vehicle-widthwise inner side of the curved portion 82 and the inner bonding portion 84, and a rear bonding portion 86 formed by bending the body 81 and the curved portion 82 upward, as shown in FIGS. 4 and 5. The right crossmember extension 51 is formed, for example, of a high tensile strength steel plate (corresponding to one having a tensile strength of 590 MPa and a thickness t of 1.4 mm).

A front portion of the body 81 is bonded to the upper surface of the horizontal portion 31 of the corresponding front side frame 16. The outer bonding portion 83 is bonded to the upper flange 34d of the horizontal portion 31. The inner bonding portion 84 is bonded to the side surface 34c of the horizontal portion 31. The crossmember bonding portion 85 is bonded to the upper and side surfaces of the right crossmember 66. The rear bonding portion 86 is bonded to the dash panel 19 (FIG. 1) and the upper flange 66d of the right crossmember 66.

The left crossmember extension 51 is so shaped that the left and right crossmembers extension 51 are symmetric with respect to the center of the vehicle width direction.

In the front vehicle body structure 20, employing the crossmember extensions 51 to connect the front side frames 16 to the dash panel 19 and the crossmember 24 allows a steady breaking mode to be achieved at the time of an offset collision.

Using other types of crossmember extension 51 allows the front side frames 16 to be used in a variety of vehicle body models or the front side frames 16 to be used common thereto. Further, the shape of the front side frames 16 can be simplified, whereby the productivity of the front side frames 16 in a press working process can be improved.

The left and right crossmember extensions 51, 51, each of which has the body 81 and the curved portion 82 formed therefrom, can readily transmit a collision load transmitted from the left and right front side frames 16, 16 to the crossmember 24.

Figure 6:
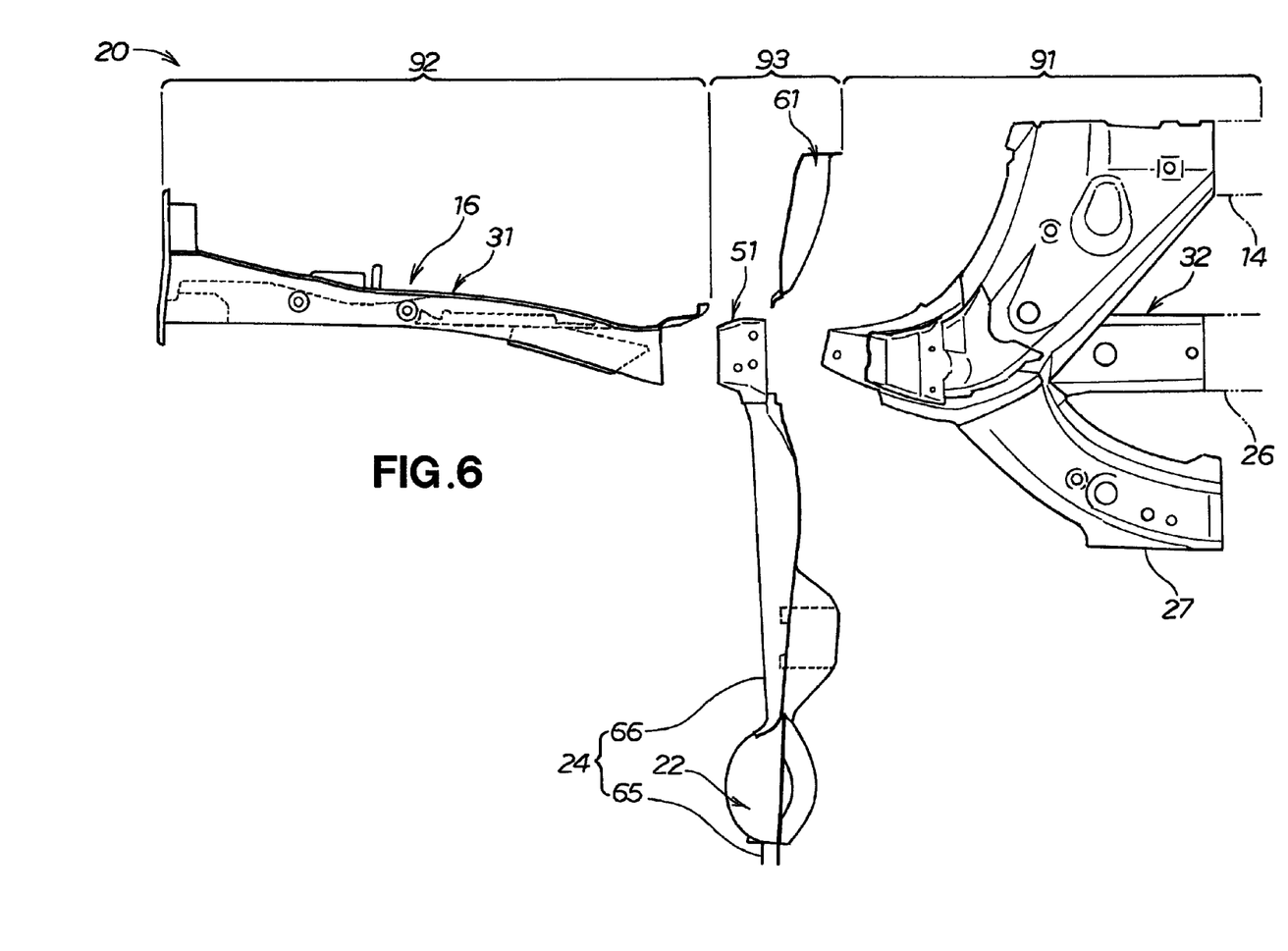
FIG. 6 is a plan view of the exploded front vehicle body structure of FIG. 4.
Figure 7:
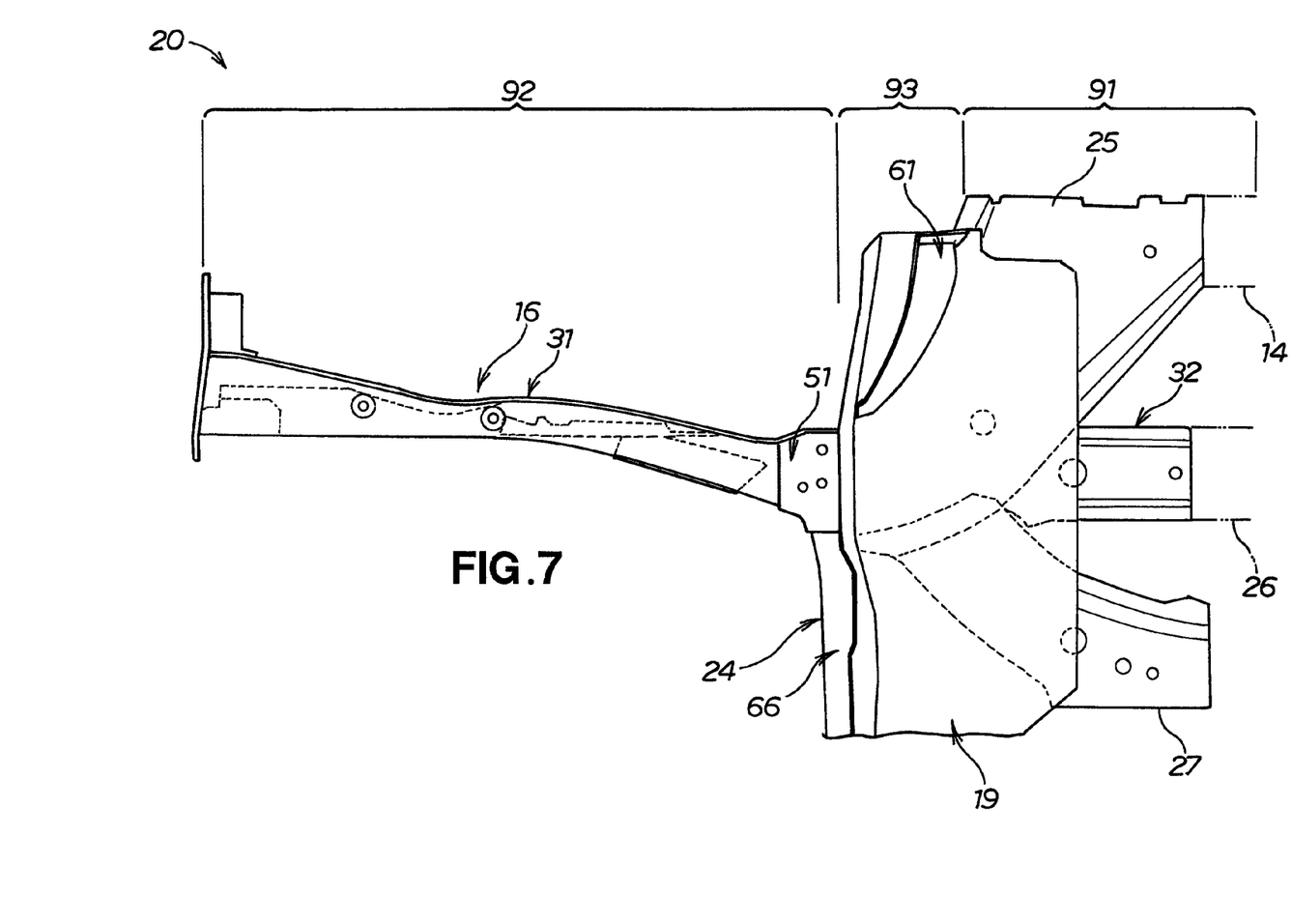
FIG. 7 is a plan view of the front vehicle body structure shown in FIG. 5.

A passenger compartment space member 91 disposed in a lower portion of the passenger compartment 12 (FIG. 1) is formed of one of the inclined portions 32 of the front side frames 16, the outriggers 25, the floor frames 26, and the central frames 27, as shown in FIGS. 6 and 7. An engine space member 92 disposed in the engine space 13 (FIG. 1) is formed of one of the horizontal portions 31 of the front side frames 16. A crossmember assembly 93, which is positioned to substantially overlap with the crossmember 24 in a side view, is formed of the right and left crossmembers 65 and 66 (FIG. 5), the joint cover 22, the gussets 61, 61, and the vertical reinforcing member 62.

In the front vehicle body structure 20 according to the present embodiment, the passenger compartment space member 91 is separated from the engine space member 92 by the crossmember assembly 93. As a result, the engine space member 92 can be commonly used, and the passenger compartment space member 91 can be replaced in accordance with the type of a vehicle body. In this way, the number of types of vehicle body 11 can be increased, and the versatility of the vehicle body 11 can be enhanced.

The front vehicle body structure 20 according to the present embodiment includes the left and right front side frames 16, 16 extending in the front-rear direction of the vehicle body, the left and right side sills 14, 14 disposed between the left and right front side frames 16, 16 and the rear of the vehicle body, the dash panel 19, which extends in the vehicle width direction and separates the passenger compartment 12 from the engine space 13, the cup-shaped joint cover 22, which is provided on the dash panel 19 on the side facing the engine space 13 and has the opening 74 through which the steering shaft 21 is inserted, and the crossmember 24, which is provided on the dash panel 19 on the side facing the engine space 13 and extends between the left and right front side frames 16, 16, as shown in FIGS. 1 to 9.

Since the crossmember 24 is divided into the left crossmember 65 and the right crossmember 66, which sandwich the cup-shaped joint cover 22, the crossmember 24 can extend at an optimum height between the left and right front side frames 16, 16 even when the joint cover 22 is present at the same height as the crossmember 24. In this way, the passenger compartment space allows the steering shaft 21 to be disposed in an optimum attitude and the vehicle occupant to readily drive the vehicle. Further, when a head-on collision occurs, a steady deformation mode of the left and right front side frames 16, 16 can be achieved.

The cup-shaped joint cover 22 protrudes forward from the left and right crossmembers 65, 66. As a result, when a head-on collision occurs and the engine or any other power unit retracts, the joint cover 22 is first deformed and hence the magnitude of impact is reduced.

Since the cup-shaped joint cover 22 is made of a material having tensile strength smaller than that of the left and right crossmembers 65, 66 and formed of a plate thicker than the left and right crossmembers 65, 66, the joint cover 22 more readily deform and can absorb a greater amount of energy than the left and right crossmembers 65, 66.

The cup-shaped joint cover 22 has the bottom surface 75, through which the opening 74 is formed, the circumferential wall 76, which extends from the bottom surface 74 toward the dash panel 19, the annular flange 77, which is formed around the end of the circumferential wall 76, and the left and right flat surfaces 78, 79, which are formed by making part of the circumferential wall 76 flat.

Since the annular flange 77 is connected to the dash panel 19, the left and right crossmembers 65, 66 can be reinforced. Since the ends of the left and right crossmember 68, 71 (vehicle-widthwise inner ends) are connected to the left and right flat surfaces 78, 79, the left and right crossmember ends 68, 71 can be connected to the joint cover 22 more firmly, for example, even when the circumferential wall 76 of the joint cover 22 is curved.

Since the rear portions of the front side frames 16 are inclined downward toward the rear of the vehicle body and connected to the side sills 14 via the outriggers 25, each of which has a shape widening toward its end, a head-on collision load acting on the front side frames 16 is actively distributed to the side sills 14.

Further, when a head-on collision load acts on one of the front side frames 16, the head-on collision load is also distributed to the side sill 14 on the other side via the crossmember 24 and the outrigger 25 on the other side.

Since the vertical reinforcing member 62, which intersects the crossmember 24 to reinforce the dash panel 19, is provided on the dash panel 19, the vertical reinforcing member 62 can not only reinforce the dash panel 19 but also improve how firmly the crossmember 24 is supported. As a result, vibration from a road surface will not be transmitted.

Since the dash panel 19 and the crossmember 24 are disposed in the vicinity of the rear ends of the horizontal portions 31 of the front side frames 16, a collision load can be smoothly transmitted and distributed rightward and leftward.

Since the front side frames 16 are connected to the dash panel 19 and the crossmember 24 via the crossmember extensions 51, which encourage the front side frames 16 to break steadily at the time of an offset collision, the front side frames 16 can steadily break in a controlled manner at the time of an offset collision.

As described above, since each of the front side frame 16 is provided with and reinforced by the corresponding stiffener 41, and the break point 53 is set between the stiffener 41 and the corresponding crossmember extension 51, the stress induced by a collision load can be concentrated at the break point 53, and a collision mode can be reliably controlled at the position where the broken point 53 is set.

Since the passenger compartment space member 91 is separated from the engine space member 92 by the crossmember assembly 93, for example, replacing the crossmember assembly 93 with other types allows the existing engine space 13 to be commonly used and readily connected to passenger compartment spaces used in a variety of vehicles. In this way, the versatility of the front vehicle body structure 20 can be enhanced.

Since the gussets 61 connected to the crossmember extensions 51 via the dash panel 19 are attached to side portions of the dash panel 19 on the side facing the passenger compartment 12, the strength and rigidity of the dash panel 19 can be improved.

Since the crossmember extensions 51 disposed behind the break points 53 are supported by the crossmember 24 and the gussets 61, the stress induced by a collision load can be concentrated at the break points 53. As a result, a collision mode can be reliably controlled at the positions where the break points 53 are set. Further, no cross-sectional collapse of the members between the break points 53 and the rear of the vehicle will occur.

Since the left and right crossmember extensions 51, 51 are spot-welded to the left and right crossmembers 65, 66 by using the welding openings 56, 57 formed through the dash panel 19, the workability of the spot welding and hence the crossmember connection strength can be improved.

Since the vehicle-widthwise inner upper surfaces of the crossmember extensions 51 are curved upward and extend toward the crossmember 24, the area where the crossmember extensions 51 are connected to the crossmember 24 can be increased. An impact load can therefore be more efficiently transmitted to the crossmember 24.

The front vehicle body structure according to the present embodiment has been described with reference to the case where the steering shaft 21 is disposed on the left in the vehicle width direction, as shown in FIG. 1. The front vehicle body structure is not necessarily configured this way but the steering shaft 21 may be disposed on the right in the vehicle width direction.

The front vehicle body structure according to the present embodiment has been described with reference to the case where the left crossmember 65 is shorter than the right crossmember 66, as shown in FIG. 1, but the lengths of the crossmembers 65, 66 may be changed as appropriate.

The crossmember extensions 51 are supported by the crossmember 24 and the gussets 61, 61 bonded to the dash panel 19, as shown in FIG. 1. The crossmember extensions 51 may further be supported by other members disposed in the vicinity of the dash panel 19.

The front vehicle body structure according to the present embodiment has been described with reference to the case where the crossmember extensions 51 are monolithically formed, as shown in FIG. 1. The front vehicle body structure is not necessarily configured this way, but the crossmember extensions 51 may be formed by combining two or more parts. Further, each of the crossmember extensions 51 may be provided with a bead or any other suitable reinforcing component.

INDUSTRIAL APPLICABILITY

The front vehicle body structure according to the invention is suitably used in a sedan-type, wagon-type, or other type of passenger vehicle.

Reference Signs List
10 vehicle
12 passenger compartment
13 engine space
14 side sill
16 front side frame
19 dash panel
20 front vehicle body structure
21 steering shaft
22 cup-shaped joint cover
24 crossmember
25 outrigger
31 horizontal portion
32 inclined portion
41 stiffener
51 crossmember extension (connection member)
53 break point
56, 57 welding opening
61 gusset
62 vertical reinforcing member
65, 66 left and right crossmember
68, 71 left and right ends of crossmember (vehicle-widthwise inner ends)
74 opening
75 bottom surface
76 circumferential wall
77 annular flange
78, 79 left and right flat surfaces
91 passenger compartment space member
92 engine space member
93 crossmember assembly

The invention claimed is:

1. A front vehicle body structure comprising:
left and right front side frames extending in a front-rear direction of a vehicle body;
left and right side sills disposed respectively at a rear part of the left and right front side frames and extending in the front-rear direction of the vehicle body;
a dash panel extending in a vehicle width direction and separating an engine space from a passenger compartment;
a cup-shaped joint cover provided on the dash panel on a side facing the engine space and having an opening through which a steering shaft is inserted; and
a crossmember provided on that side of the dash panel which faces the engine space and extending between the left and right front side frames,
wherein the crossmember is divided into a left crossmember and a right crossmember, and the cup-shaped joint cover is sandwiched between the left and right crossmembers.

2. The front vehicle body structure of claim 1, wherein the joint cover protrudes forward from the left and right crossmembers.

3. The front vehicle body structure of claim 1, wherein the joint cover has a lower tensile strength than that of the left and right crossmembers and a plate thickness greater than those of the left and right crossmembers.

4. The front vehicle body structure of claim 1, wherein the joint cover includes a bottom surface through which the opening is formed, a circumferential wall extending from the bottom surface to the dash panel, an annular flange formed around an outer circumference of the circumferential wall, and left and right flat surfaces formed by making part of the circumferential wall flat, the annular flange is connected to the dash panel, and an end of the left and right crossmembers is connected to the left and right flat surfaces, respectively.

5. The front vehicle body structure of claim 1, wherein the front side frame has a rear end portion inclined downwardly rearwardly of the vehicle body and connected to the side sill via an outrigger having a shape widening toward the end.

6. The front vehicle body structure of claim 1, wherein the dash panel includes a vertical reinforcing member intersecting the crossmember and reinforcing the dash panel.

7. The front vehicle body structure of claim 1, wherein the front side frame includes a horizontal portion extending substantially horizontally in the front-rear direction of the vehicle body in the engine space and an inclined portion inclined downward from the horizontal portion rearwardly of the vehicle body and connected to the side sill via an outrigger having a shape widening toward the end, the dash panel and the crossmember are connected in a vicinity of a rear end of the horizontal portion of the front side frame, and the front side frame is connected to the dash panel and the crossmember via a crossmember extension that assists the front side frame in breaking steadily upon an offset collision.

8. The front vehicle body structure of claim 7, wherein the front side frame includes a stiffener provided in the front side frame and reinforcing the front side frame, and has a break point between the stiffener and the crossmember extension.

9. The front vehicle body structure of claim 7, wherein the outrigger is part of a passenger compartment space member disposed in a lower portion of the passenger compartment, the horizontal portion of the front side frame is part of an engine space member disposed in the engine space, the crossmember is part of a crossmember assembly disposed to substantially overlap with the crossmember as viewed from one side, and the passenger compartment space member is separated from the engine space member by the crossmember assembly.

10. The front vehicle body structure of claim 7, wherein the crossmember extension is connected to a gusset via the dash panel, and the gusset is provided to a side portion of the dash panel on a side facing the passenger compartment.

11. The front vehicle body structure of claim 7, wherein the crossmember is spotwelded to the crossmember extension through a welding opening formed in the dash panel.

12. The front vehicle body structure of claim 7, wherein a rear portion of the crossmember extension forms an upper wall curved upward toward the crossmember and extending inward in the vehicle width direction.

* * * * *